United States Patent [19]
Kemper

[11] 3,947,179
[45] Mar. 30, 1976

[54] DOUGH ROLLING MACHINE

[76] Inventor: Kate Kemper, Wybuelstr. 6, CH-8702 Zurich-Zollikon, Switzerland

[22] Filed: Sept. 17, 1973

[21] Appl. No.: 397,949

[30] Foreign Application Priority Data
Sept. 16, 1972 Germany.......................... 2245616

[52] U.S. Cl. ................ 425/223; 425/320; 425/230
[51] Int. Cl.² .......................................... A21C 3/06
[58] Field of Search .......... 425/319, 320, 223, 230; 15/256.51, 256.52

[56] References Cited
UNITED STATES PATENTS

| 115,039 | 5/1871 | Duff.................................. 425/230 |
| 1,650,758 | 11/1927 | Kukla................................ 425/230 |
| 1,796,922 | 3/1931 | Eseman.......................... 425/320 X |
| 1,805,018 | 5/1931 | Scruggs............................ 425/320 |
| 2,323,907 | 7/1943 | Harriss et al..................... 15/256,51 |
| 3,116,703 | 1/1964 | Enoch et al.................... 425/320 X |
| 3,179,083 | 4/1965 | Warner........................... 15/256.52 |

FOREIGN PATENTS OR APPLICATIONS

| 27,367 | 5/1933 | Netherlands...................... 425/320 |
| 682,910 | 6/1930 | France.............................. 425/320 |
| 120,176 | 12/1930 | Austria............................. 425/320 |

Primary Examiner—Francis S. Husar
Assistant Examiner—David S. Safran
Attorney, Agent, or Firm—Edwin E. Greigg

[57] ABSTRACT

The disclosure relates to a dough processing machine that is capable of continuously feeding pieces of dough on a traveling surface first to a roll for the flattening operation where the pieces of dough are caused to assume the proper length and width for the desired product to be created therefrom. As the flattened dough is emitted from the rolling operation, the leading edge thereof is caused to be raised from the traveling surface and directed rearwardly while the remainder of the dough progresses through the rolling operation and is advanced to another member which rolls the length of dough upon itself to complete the formation of the finished product.

9 Claims, 1 Drawing Figure

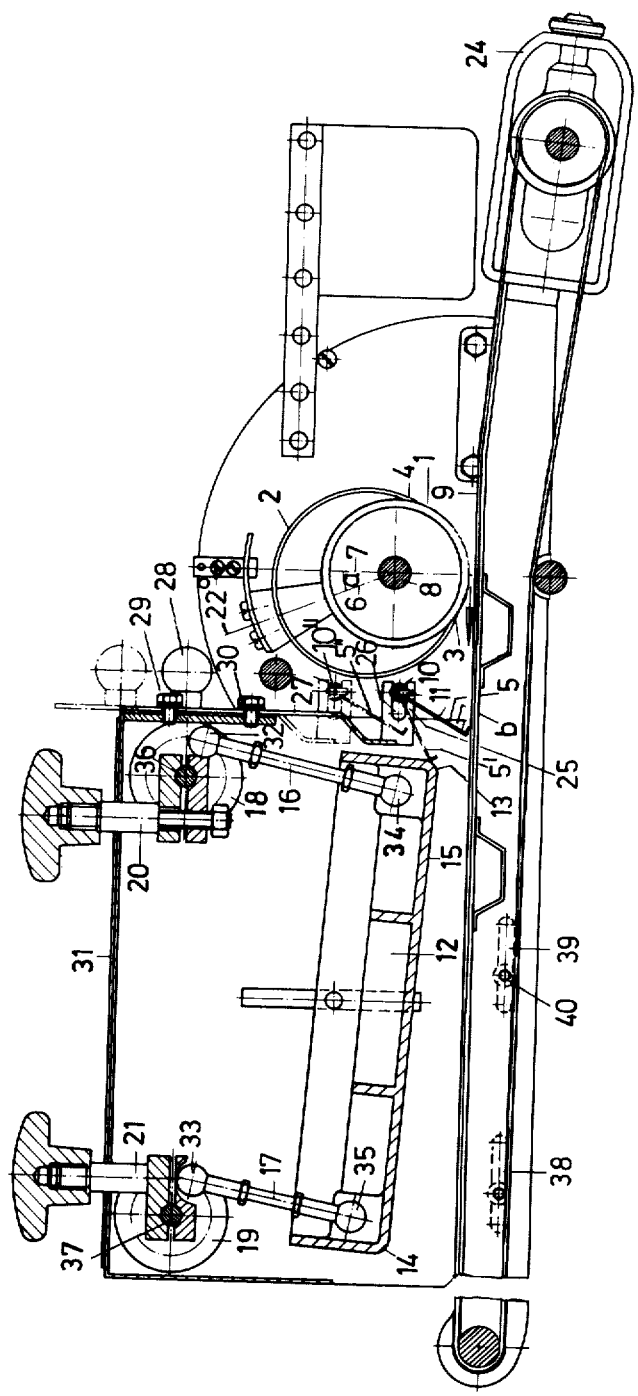

DOUGH ROLLING MACHINE

The invention relates to a device and a method for rolling flat and rolling up pieces of dough, such as are used for the production of small loaves and rolls slit longitudinally. The invention relates in particular, but not exclusively, to such a device and method which uses a rotatable roller which is provided with a stripping member, pivotally mounted flaps which are disposed following this and which are each provided with ends bent over in the form of a hook, and at least one following rolling-up member.

The machines at present on the market for the fully automatic production of small loaves, such as rolls, French rolls or the like for example, make it necessary to adapt the dough to be processed to the machines available, within certain limits. As a result, disturbances repeatedly occur in operation, because the necessary conditions cannot be adhered to constantly, such as the humidity of the air in the area of the bakery for example, which has a powerful influence on the stickiness of the dough to be processed.

The invention seeks to provide a method and a device for carrying out the rolling flat and rolling up pieces of dough, which with suitable arrangement may work substantially uniformly regardless of external influences and of the consistency of the dough.

A further problem which occurs in the fully automatic production of small loaves is due to the fact that it is of decisive importance for the baking process that the portions of dough should be deposited regularly on the surface of the baking oven. The depositing of the portions of dough from the so-called bread-roll lines on the leavened-goods carriers for charging the baking ovens is effected fully automatically, and care has to be taken to ensure that the depositing is effected regularly. Thus it is necessary, therefore, to carry out the operation of rolling up the portions of dough in a precise and constant manner in the bread-roll line.

Members for carrying out the rolling-up operation consisting of various working steps have already long been known, but these do not work with the necessary accuracy and in addition do not cooperate in such a manner that the smallest and largest portions of dough arriving for processing are rolled up precisely and uniformaly. Thus rollers, for example, have long been known for rolling flat the portions of dough, at the circumference of which there is provided a scraper rail to detach the portions of dough from the roller. In the rollers of this kind hitherto known, the stripping edges of the scraper rails are mounted at the circumference of the roller in such a manner that when the consistency and the stickiness of the dough permit it, the portions of dough remain adhering to the roller to beyond the range of action thereof and are only detached from the roller after travelling through an angular range of about 50° or 60°. If a uniform dough is used and if specific environmental conditions are adhered to, such as the humidity of the air in the surrounding area for example, such a roller device works relatively accurately. If the conditions referred to alter, however, then the stickiness of the dough also varies and hence the adhesion to the roller. Thus the leading edge of the piece of dough reaches the folding member disposed following the roller at different times, however, so that the whole rolling-up operation, in relation to the individual pieces of dough, no longer takes place constantly.

Folding members are also known already in the most varied forms of construction, which are constructed, for example, in the form of resilient aprons or also in the form of plates which are pivotable about an axis. In a medium range of weight of the pieces of dough of about 50 g, there are no problems with either folding member. When a resilient apron is used, the resilience of the apron is designed for this medium range of weight. Now if pieces of dough in a range of weight from 10 to 20 g for example arrive for processing, the resilience of the apron may have been made too little so that the adhesion of the pieces of dough to the conveyor belt is not sufficient to achieve swinging away of the apron and hence lifting of the pieces of dough. Thus the pieces of dough remain in front of the apron and an accumulation of pieces of dough results in front of the folding member. On the other hand, if pieces of dough having a relatively great weight arrive for processing, the resilience of the apron may be too great to cause a sufficient force for lifting the front edges of the pieces of dough. Instead of being lifted, the resilient apron causes the portions of dough to be pressed flat.

Turnover hooks have also been used already, which are secured to transverse pins for swinging and intervene in the path of the piece of dough supplied to the hook. There turnover hooks consist of a uniform piece so that the front edge of the piece of dough, which is generally irregular, can only act at some points and accordingly makes the turning over irregular and causes harmful tensions in the piece of dough. In order to avoid this disadvantage, according to the German Pat. No. 419,565, a plurality of plates have been used which were bent over in the form of hooks and which, distributed over the width of the piece of dough, can swing between adjustable stop rails. These ends of the plates which are bent over in the form of hooks can grasp and fold the piece of dough independently of one another, so that rolling up of the piece of dough is effected regardless of how its front edge extends. When the piece of dough leaves the preceding roller for rolling flat smoothly, such turnover members work relatively accurately, if the dimensioning, that is to say the size and the weight of the plates, is in correct relationship to the average weight of the pieces of dough arriving for processing. Such a device is, however, largely dependent on the consistency and size of the pieces of dough arriving for processing. Actually, if the pieces of dough remain adhering to the roller for a certain length of time, which frequently occurs in practice, the whole dough-shaping machine works inaccurately, because the rolling-up operation would be initiated already by the roller, so that the ends bent over into the form of hooks grasp a portion of the piece of dough which has already been lifted. At the end of the rolling-up operation, such a piece of dough has a different angular position of the closure from the pieces processed previously or subsequently. In order to avoid adherence in such cases, it is necessary to sprinkle the piece of dough and/or the suface of the roller continuously with flour.

When pivotally mounted plates are used as a rolling-up member, there are also similar problems to those with resilient aprons, if pieces of dough having an extremely low weight are to be processed. Actually, if the weights of the pieces of dough are too low in relation to the dimensioning of the plates, here there is the danger that the pieces of dough may remain in front of the flap and that an accumulation of pieces of dough may thus form.

In order to at least partly overcome one or more of the above disadvantages the present invention provides a device for rolling up pieces of dough, comprising, in the following order in the direction of dough movement, through the device, flattening means for flattening the dough pieces, turning means for turning up the leading edges of the flattened dough pieces, and rolling means for rolling up the dough pieces when flattened and with their leading edges turned up, the flattening means, the turning means and the rolling means being so mutually arranged that a piece of dough passing through the device is at all times subject to at lease one of the said means.

Preferably the method is effected by means of a rotatable roller provided with a stripping member, pivotally mounted flaps which are diposed following thereon and which are each provided with ends bent over in the form of hooks, and at least one following rolling-up member, the arrangement being such that the plane portions of the pieces of dough rolled flat by the roller are detached from the roller by mechanical means immediately after the rolling region, the front edges of the pieces of dough are grasped and raised by the hooked ends of the flaps while at least the end portions of the particular piece of dough are still under the influence of the roller so that a thrust action in the direction of the flaps is exerted on the pieces of dough, the rolling-up operation initiated by the flaps is continued by the rolling-up member following directly thereon while the corresponding flap is still acting on the particular piece of dough, and the rolling-up operation is completed consistently by the rolling-up member.

More particularly, the method is preferably carried out by a device which comprises at least one rotatably mounted roller provided with a stripping member, a movable counter surface carrying of the pieces of dough, following flaps pivotally mounted parallel to the axis of the roller, and at least one following rolling-up member, the dough-stripping member being disposed coaxially to the roller and being associated by its stripping edge with the circumference of the roller in such a manner that the range of action for rolling out the pieces of dough is restricted to a minimum, and the pivotally mounted flaps, which follow immediately after the folder, being disposed at the shortest possible distance from this so that the operation of rolling up the pieces of dough is initiated while place portions thereof are still within the range of action of the roller. The dough-stripping member is advantageously constructed in the form of a resilient cylinder which is cut open in the axial direction and of which the cut edges extending in the axial direction are mounted for scraping on the roller under spring pressure. The normal on the imaginary line connecting the cut edges of the cylinder, seen in cross-section, forms an angle of between 20° and 25° to the vertical. Preferably the flaps are mounted parallel to the axis of the roller, side-by-side a short distance apart, so as to pivot independently of one another in the direction of movement of the counter surface, and scrape on the movable counter surface in the absence of a piece of dough.

In a further development of the invention, the flaps are mounted on a spindle which can be adjusted horizontally and, independently thereof, vertically. By this means, the effect is achieved that the flaps can be removed from the range of action so that the device can also be used for rolling flat pieces of dough which do not need to be rolled up.

In order to bring about an advantageous angular position of the flaps in relation to the movable counter surface, which may, for example, be constructed in the form of a conveyor belt, each flap may be provided with a stop member on its pivot so that, in the position in which it is out of contact with the counter surface, the flap forms an angle larger than 15° with the vertical.

Advantageously the flaps consist of metal and appropriate means such as, for example, magnetic members or weighting members are provided for varying their weight and connected to the flaps by screwing or insertion.

The rolling-up member may be constructed in a manner known per se as a rolling surface which is provided with rounded surface portions at the entry and exit sides of the pieces of dough, and the entry and exit sides are adjustable in height independently of one another so that the effective rolling path for the pieces of dough is variable.

In an advantageous further development of the rolling-up member, the rolling surface is held at its entry and exit sides by articulatedly mounted variable-length telescopic spindles each of which is further connected at its other end, in an eccentric and articulated manner, to a disc rotatable about an axis. Each of the discs is adapted for rotation by means of a worm shaft, a hand wheel or a handle being provided at the upper end of the worm shaft.

The invention is explained in more detail with reference to the accompanying drawing in which one example of an embodiment is illustrated. The drawing represents a cross-section through the whole installation which can be used either as a component in a so-called bread-roll line or as a separate device for rolling flat and rolling up pieces of dough.

A roller 1, which is mounted for rotation about a shaft 8, is opposed by a counter surface 9 for co-operation with the roller. The counter surface is constructed in the manner of an endless belt and can be tensioned by means of a tensioning device 24. A dough-stripping member 2, which is mounted parallel to the shaft 8 of the roller 1, consists of a cylindrical body which is cut open along its longitudinal axis and is bounded by a stripping edges 3 and 4. These stripping edges 3 and 4 are adapted for scraping on the surface of the roller 1 by spring pressure. The dough-stripping member 2 of cylindrical construction is made resilient so that adequate pressure on the surface of the roller 1 is achieved. The stripping edges 3 and 4 are made tangential in accordance with their correlation with the surface of the roller 1 so that satisfactory separation of the dough from the surface of the roller is achieved. The normal 6, which is perpendicular to the imaginary line connecting the stripping edges 3 and 4, forms and angle a of about 22° with the vertical 7. By this means, the stripping edge 3 of the dough-stripping member 2 is associated with the circumference of the roller 1 in such a manner that the range of action for rolling out the pieces of dough, that is to say the effective roller circumference, is restricted to a minimum.

Mounted for vertical adjustment parallel to the shaft 8 of the roller 1 is a shaft 10 on which flaps 5 are mounted for pivoting. The shaft 10 and hence the individual flaps 5 are disposed immediately following the roller 1 and at the shortest possible distance from this, so that the operation of rolling up pieces of dough leaving the area between the roller 1 and the movable counter surface 9 is initiated while the plane portions of the pieces of dough are still within the range of action of the roller 1.

Associated with each flap 5 on the shaft 10 is a stop member 11 such that the deflection of the flaps 5 from the vertical is limited to an angle $b$. The limitation of the deflection of the flaps 5 in the direction of the horizontal is effected by the rounded surface portion 13 of a rolling-up member 12 later to be described. The upper limiting position of the flaps 5 is represented by the flap 5' shown in broken lines. At its ends, the shaft 10 is mounted in a sheet-metal member 25 and can be displaced horizontally in a slot 26 which is provided in the sheet metal member 25. The shaft 10 is rigidly connected to the sheet-metal member 25 by screw connections not illustrated. The sheet-metal member 25 is in turn secured to a vertically adjustable holding member 27, the adjustment in height of which is effected by means of a handle 28. The holding member 27 is adjustably connected by means of screw connections 29 and 30 to a housing 31 which also carries holding and adjusting devices for the rolling-up member 12.

The rolling-up member 12 is constructed in the form of a rolling surface 15 which is provided with rounded surface portions 13 and 14 at the entry and exit sides of the pieces of dough, and the entry and exit sides of which are adjustable in height independently of one another so that the effective rolling path for the pieces of dough is variable. The adjustment in height is effected through articulately mounted, variable-length telescopic spindles 16 and 17, which are each eccentrically and articulately connected to a rotatably mounted disc 18 or 19 at their upper ends 32 or 33. The telescopic spindles 16 and 17 are variable in length and a change in position of the rolling-up member 12 both in the horizontal and in the vertical direction is rendered possible by means of their articulately constructed bearing arrangements 32 and 34 or 33 and 35. The effective rolling path of the rolling surface 15 can, however, also be varied by means of a different variation in the length of the telescopic spindles 16 and 17, for example by shortening the telescopic spindle 17 so that the rearmost rounded surface portion 14 is at a greater distance from the counter surface 9 than the front rounded surface portion 13. The rolling surface 15 may be covered with a felt cloth in a manner known per se. Teflon, for example, is also suitable for the covering.

The discs 18 and 19 are mounted for rotation about their shafts 36 and 37 respectively and can each be actuated by a worm shaft 20 or 21.

The individual working members such as the roller 1, the flaps 5 and the rolling-up member 12 are so correlated or mutually disposed that their ranges of action overlap even with the smallest pieces of dough arriving for processing. Thus, before leaving one range of action, for example of the roller 1, even the smallest piece of dough to be processed, is already under the influence of the following range of action, namely in this case of the flaps 5. There is a corresponding relationship for the flaps 5 and the rolling-up member 12. The effect is thereby achieved that during the whole sequence of operations, each piece of dough is under the influence of at least one working member. Thus the whole sequence of operations becomes independent of the nature of the dough, of the size of the pieces of dough and other influential factors such as the humidity of the environment and temperature, which has a particular effect on the nature of the pieces of dough. Because the range of action of the roller 1 is reduced to a minimum by reason of the scraping edge 3 being taken as far as possible in the direction of the minimum spacing between the counter surface 9 and the roller 1, the effect is achieved that the areas of a piece of dough which have been rolled flat no longer rise from the counter surface 9. Thus the pieces of dough remain lying flat on the counter surface 9 and remain under the influence of the roller 1 until the front edges of the pieces of dough have been lifted sufficiently by the flaps 5. As a result, assurance is provided that the pieces of dough cannot be displaced on the counter surface 9 by the flaps 5, because a holding or thrust action by the roller 1 is effective for a sufficiently long time. The rolling-up member 12 takes over each piece of dough while it is still under the influence of the action of the flaps 5, so that the rolling-up operation can be continued and completed in a precise manner. As a result of the overlapping of the individual ranges of action, assurance is provided that when the piece of dough is transferred seriatim from one working member to another, the previous member is still active so that a precise transfer to the following member is ensured.

The whole housing 31 with the holding member 27 for holding the shafts 10 and the flaps 5 and with the whole rolling-up member 12 can be displaced horizontally. Attachment members 40, which can be displaced and fixed in slots 38 and 39, serve for this. The solts 38 and 39 are in those further housing members which also guide the conveyor belt 9 at the same time. Thus all folding and rolling-out members can advantageously be adjusted and displaced differently and horizontally in relation to the roller 1, so that all pieces of dough from the lowest to the highest weights can be processed, completely independently of their dough consistency, and the sequence of operations takes place fully automatically and uniformly.

We claim:

1. In a dough preparing apparatus having an endless belt for transporting dough pieces seriatim to a first dough rolling element, thereafter to means for elevating the front edge of the dough pieces, and finally to a second dough rolling member, the combination comprising, said endless belt having an upper flight arranged to traverse a horizontal inflexible surface, said first rolling element being supported on a horizontally disposed shaft and associated with a dough stripping member, said dough stripping member including a flexible tubular member that is provided with a longitudinally extending slitted wall having opposed abutting edge portions, each of which has been moved laterally to permit a biased engagement with the periphery of said first rolling element, said dough elevating means associated with a shaft means lying in a plane parallel with the shaft of said first rolling element and serving to lift the front edge of each dough piece and bend it backwardly upon the dough piece while it is still rolling contact with the first rolling element.

2. In a dough preparing apparatus as claimed in claim 1, in which the dough stripping member includes a support means which is to offset at an angle of between 20° and 25° relative to a vertical plane extending through the shaft of said first rolling element.

3. In a dough preparing apparatus as claimed in claim 1, in which the dough elevating means comprise a plurality of independently pivotal fingers.

4. In a dough preparing apparatus as claimed in claim 3, in which the shaft means supporting said pivotal fingers is vertically adjustable.

5. In a dough preparing apparatus as claimed in claim 4, in which the shaft means is horizontally adjustable.

6. In a dough preparing apparatus as claimed in claim 3, in which stop means are associated with said fingers, said stop means serving to maintain the said fingers at an angle of 15° relative to their support shaft.

7. In a dough preparing apparatus as claimed in claim 1, in which the second dough rolling member includes a relatively flat surface area, the entry and exit areas of which are rounded, further means being included to permit independent adjustment of both the entry and exit areas thereof to provide a variable path for rolling the said dough pieces.

8. In a dough preparing apparatus as claimed in claim 7, in which said independent adjustment of said second rolling surface includes plural means providing for both linear and rotatable movement thereof.

9. In a dough preparing apparatus as claimed in claim 8, in which the rotary movement is achieved by plural worm shafts which serve to raise or lower the second rolling member.

* * * * *